(12) United States Patent
Wilson

(10) Patent No.: US 11,655,527 B2
(45) Date of Patent: *May 23, 2023

(54) AUSTENITIC STAINLESS STEEL ALLOYS AND TURBOCHARGER KINEMATIC COMPONENTS FORMED FROM STAINLESS STEEL ALLOYS

(71) Applicant: Garrett Transportation I Inc, Torrance, CA (US)

(72) Inventor: Marc Wilson, Deyvillers (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,999

(22) Filed: Jul. 1, 2020

(65) Prior Publication Data

US 2022/0002848 A1 Jan. 6, 2022

(51) Int. Cl.
| | |
|---|---|
| *C22C 38/44* | (2006.01) |
| *C22C 38/34* | (2006.01) |
| *C22C 38/00* | (2006.01) |
| *C22C 38/04* | (2006.01) |
| *C21D 6/00* | (2006.01) |
| *F02B 37/00* | (2006.01) |

(52) U.S. Cl.
CPC .............. *C22C 38/44* (2013.01); *C21D 6/002* (2013.01); *C22C 38/001* (2013.01); *C22C 38/002* (2013.01); *C22C 38/04* (2013.01); *C22C 38/34* (2013.01); *F02B 37/00* (2013.01); *C21D 2211/001* (2013.01); *F05D 2220/40* (2013.01)

(58) Field of Classification Search
None
See application file for complete search history.

(56) References Cited

U.S. PATENT DOCUMENTS

| | | | |
|---|---|---|---|
| 4,929,419 A | 5/1990 | Wegman et al. | |
| 5,194,221 A | 3/1993 | Culling | |
| (Continued) | | | |

FOREIGN PATENT DOCUMENTS

| | | | | |
|---|---|---|---|---|
| CA | 2934084 A1 | 7/2015 | | |
| DE | 102013216473 A1 | * | 2/2015 | ............ F16C 33/121 |
| (Continued) | | | | |

OTHER PUBLICATIONS

Boyd R Davis et al, "Final Report on Effect of Impurities in Steel", 2006, 10.13140/RG.2.2.33946.85440.

(Continued)

*Primary Examiner* — Anthony M Liang
(74) *Attorney, Agent, or Firm* — Quinn IP Law

(57) ABSTRACT

An austenitic stainless steel alloy and turbocharger kinematic components are provided. An austenitic stainless steel alloy includes, by weight, about 23% to about 27% chromium, about 18% to about 22% nickel, about 0.5% to about 2.0% manganese, about 1.2% to about 1.4% carbon, about 1.6% to about 1.8% silicon, about 0.2% to about 0.4% nitrogen, about 0% to about 0.5% molybdenum, sulfur in an amount of less than about 0.01%, phosphorous in an amount of less than about 0.04%, and a balance of iron, and other inevitable/unavoidable impurities that are present in trace amounts. The turbocharger kinematic components are made at least in part using this stainless steel alloy.

10 Claims, 3 Drawing Sheets

(56) References Cited

U.S. PATENT DOCUMENTS

| | | | |
|---|---|---|---|
| 6,485,679 B1 | 11/2002 | Sundstrom et al. | |
| 8,287,805 B2 | 10/2012 | Sjodin | |
| 11,414,734 B2* | 8/2022 | Wilson | C22C 38/04 |
| 2007/0217941 A1* | 9/2007 | Hayashi | C22C 38/001 |
| | | | 420/38 |
| 2013/0216423 A1 | 8/2013 | Oura et al. | |

FOREIGN PATENT DOCUMENTS

| | | |
|---|---|---|
| DE | 102013216473 A1 | 2/2015 |
| EP | 2765214 A2 | 8/2014 |
| WO | 9324673 A1 | 12/1993 |
| WO | 2013059104 A1 | 4/2013 |

OTHER PUBLICATIONS

Denton, Tom. (2018). Automobile Mechanical and Electrical Systems (2nd Edition). Taylor & Francis, p. 125. (Year: 2018).

* cited by examiner

AUSTENITIC STAINLESS STEEL ALLOYS AND TURBOCHARGER KINEMATIC COMPONENTS FORMED FROM STAINLESS STEEL ALLOYS

TECHNICAL FIELD

The present disclosure generally relates to iron-based alloys, such as austenitic stainless steel alloys, and articles of manufacture formed therefrom. More particularly, the present disclosure relates to stainless steel alloys used in (for example) turbine and turbocharger kinematic components, wherein such kinematic components exhibit increased wear resistance at elevated (turbocharger operating) temperatures.

BACKGROUND

In the context of turbine engines, turbochargers use heat and volumetric flow of engine exhaust gas to pressurize or boost an intake air stream into a combustion chamber. Specifically, exhaust gas from the engine is routed into a turbocharger turbine housing. A turbine is mounted inside the housing, and the exhaust gas flow causes the turbine to spin. The turbine is mounted on one end of a shaft that has a radial air compressor mounted on an opposite end thereof. Thus, rotary action of the turbine also causes the air compressor to spin. The spinning action of the air compressor causes intake air to enter a compressor housing and to be pressurized or boosted before the intake air is mixed with fuel and combusted within the engine combustion chamber.

Various systems within turbochargers include tribological interfaces, that is, surfaces of components that interact with and move relative to one another while the turbocharger is in operation. Such components, which are commonly referred to as kinematic components, may be susceptible to friction and wear, especially at elevated temperatures, which reduces their service life. Examples of turbocharger systems that may include kinematic components include waste-gate systems, which divert exhaust gasses away from the turbine to regulate airflow to the turbine, and variable geometry systems, which include a row of moveable inlet vanes to accomplish the same purpose. These systems commonly include various components such as shafts, bushings, valves, and the like, which are kinematic components because they interact and move relative to one another, and they are thus subject to friction wear. In the prior art, relatively more expensive alloys having high nickel or cobalt fractions may have been used.

Accordingly, it is desirable to provide materials that are suitable for use in fabricating kinematic components for turbine engines that can resist wear during elevated temperature operations. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Austenitic stainless steel alloys, and turbocharger kinematic components fabricated from such alloys, are provided.

In an embodiment, by way of example only, an austenitic stainless steel alloy includes or consists of, by weight, about 23% to about 27% chromium, about 18% to about 22% nickel, about 0.5% to about 2.0% manganese, about 1.2% to about 1.4% carbon, about 1.6% to about 1.8% silicon, about 0.2% to about 0.4% nitrogen, about 0% to about 0.5% molybdenum, sulfur in an amount of less than about 0.01%, phosphorous in an amount of less than about 0.04%, and a balance of iron, and other inevitable/unavoidable impurities that are present in trace amounts.

With regard to the foregoing alloy embodiments: the amount of chromium may be limited to about 24% to about 26%; alternatively or additionally, the amount of nickel may be limited to about 19% to about 21%; alternatively or additionally, the amount of manganese may be limited to about 1.0% to about 1.5%; alternatively or additionally, the amount of carbon may be limited to about 1.25% to about 1.35%; alternatively or additionally, the amount of silicon may be limited to about 1.65% to about 1.75%; alternatively or additionally, the amount of nitrogen may be limited to about 0.25% to about 0.35%, or about 0.3%; and, alternatively or additionally, the amount of molybdenum may be limited to about 0.05% to about 0.3%.

In another embodiment, by way of example only, a turbocharger kinematic component is fabricated using, at least in part, an austenitic stainless steel alloy that includes or consists of, by weight, about 23% to about 27% chromium, about 18% to about 22% nickel, about 0.5% to about 2.0% manganese, about 1.2% to about 1.4% carbon, about 1.6% to about 1.8% silicon, about 0.2% to about 0.4% nitrogen, about 0% to about 0.5% molybdenum, sulfur in an amount of less than about 0.01%, phosphorous in an amount of less than about 0.04%, and a balance of iron, and other inevitable/unavoidable impurities that are present in trace amounts.

With regard to the foregoing turbocharger kinematic component embodiments, and in particular to the austenitic stainless steel alloy used to fabricate the same: the amount of chromium may be limited to about 24% to about 26%; alternatively or additionally, the amount of nickel may be limited to about 19% to about 21%; alternatively or additionally, the amount of manganese may be limited to about 1.0% to about 1.5%; alternatively or additionally, the amount of carbon may be limited to about 1.25% to about 1.35%; alternatively or additionally, the amount of silicon may be limited to about 1.65% to about 1.75%; alternatively or additionally, the amount of nitrogen may be limited to about 0.25% to about 0.35%, or about 0.3%; and, alternatively or additionally, the amount of molybdenum may be limited to about 0.05% to about 0.3%.

In a particular embodiment of the present disclosure, disclosed is a turbocharger kinematic component comprising, at least as a part of its constituency, an austenitic stainless steel alloy, wherein the austenitic stainless steel alloy includes or consists of, by weight: about 24% to about 26% chromium, about 19% to about 21% nickel, about 1.0% to about 1.5% manganese, about 1.25% to about 1.35% carbon, about 1.65% to about 1.75% silicon, about 0.25% to about 0.35% nitrogen, about 0.05% to about 0.3% molybdenum, sulfur in an amount of less than about 0.01%, phosphorous in an amount of less than about 0.04%, and a balance of iron, and other inevitable/unavoidable impurities that are present in trace amounts.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

Figure 1:
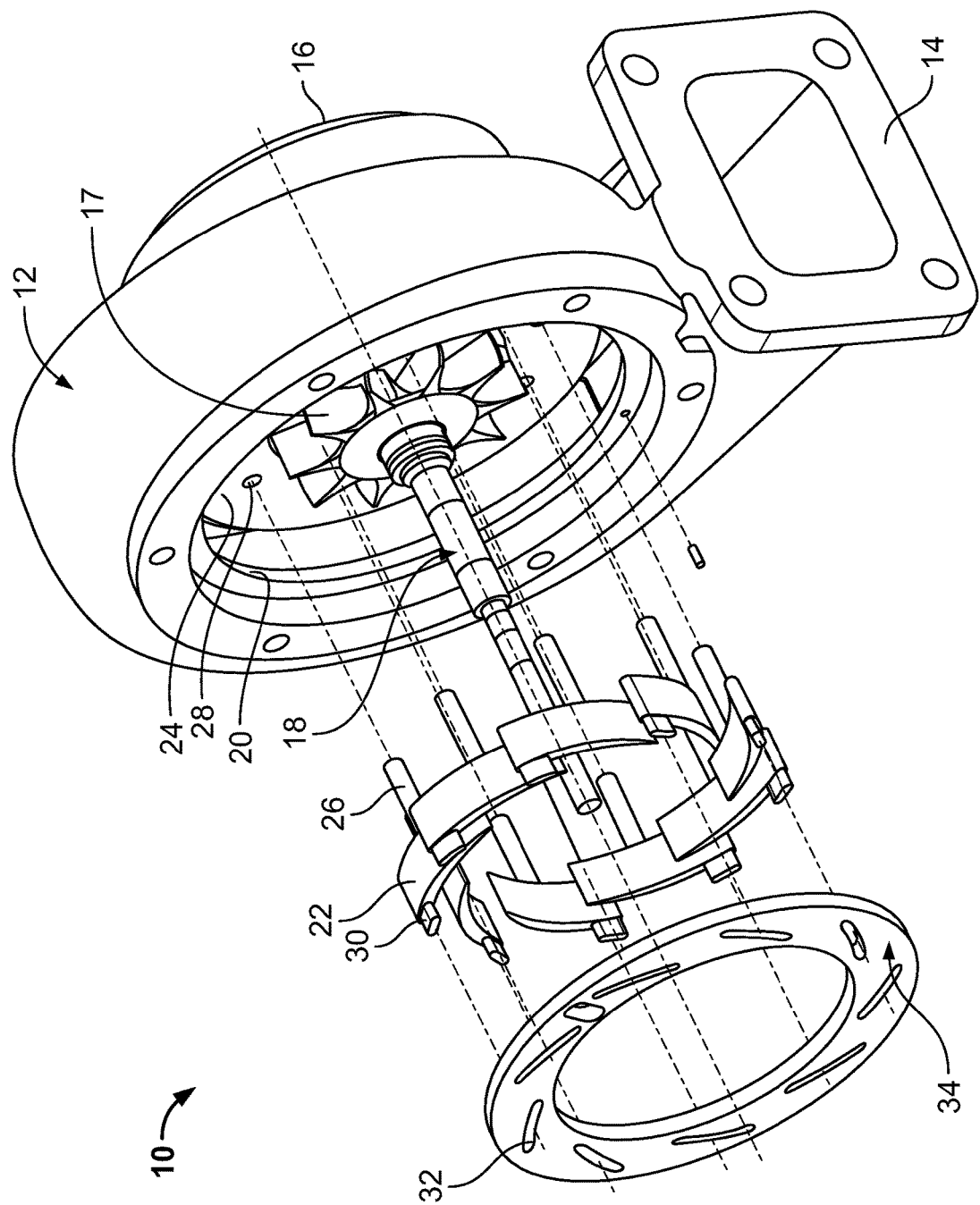
FIG. 1 is a system view of an embodiment of a turbocharged internal combustion engine in accordance with the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, all numerical values provided herein are modified by the term "about."

All of the austenitic stainless steel alloys described herein may be understood as either: (1) "comprising" the listed elements in their various percentages, in an open-ended context or (2) "consisting of" the listed elements in their various percentages, in a closed-ended context. Alternatively, the austenitic stainless steel alloys described herein may be understood as (3) "consisting essentially of" the listed elements in their various percentages, wherein other elements may be present in amounts not effecting the novel/nonobvious characteristics of the alloy. Thus, as used herein, the terms "comprising," "consisting of" and "consisting essentially of" should be understood as applicable to all of the ranges of alloy compositions disclosed herein.

All of the embodiments and implementations of the austenitic stainless steel alloys, turbocharger kinematic components, and methods for the manufacture thereof described herein are exemplary embodiments provided to enable persons skilled in the art to make or use the invention and not to limit the scope of the invention, which is defined by the claims. Of course, the described embodiments should not be considered limited to such components, but they may be considered applicable to any articles of manufacture where an iron alloy, or a stainless steel alloy may be employed. Furthermore, there is no intention to be bound by any expressed or implied theory presented in the preceding technical field, background, brief summary, or the following detailed description.

As noted above, the present disclosure is directed to austenitic stainless steel alloys for use in kinematic components of a turbocharger (for use in various vehicles and other applications) for purposes for wear with regard to the use and implementation of such kinematic components. As further noted above, a variable geometry turbocharger (among other possible turbocharger systems) may employ such kinematic components.

Accordingly, for completeness of description, FIG. 1 illustrates a portion of a variable geometry turbocharger (VGT) 10 comprising a turbine housing 12 having a standard inlet 14 for receiving an exhaust gas stream, and an outlet 16 for directing exhaust gas to the exhaust system of the engine. A volute is connected to the exhaust inlet and an integral outer nozzle wall is incorporated in the turbine housing casting adjacent the volute. A turbine wheel 17 and shaft assembly 18 is carried within the turbine housing 12. Exhaust gas, or other high energy gas supplying the turbocharger, enters the turbine housing through the inlet 14 and is distributed through the volute in the turbine housing for substantially radial delivery to the turbine wheel through a circumferential nozzle entry 20.

Multiple vanes 22 are mounted to a nozzle wall 24 machined into the turbine housing using shafts 26 that project perpendicularly outwardly from the vanes. The shafts 26 are rotationally engaged within respective openings 28 in the nozzle wall. The vanes each include actuation tabs 30 that project from a side opposite the shafts and that are engaged by respective slots 32 in a unison ring 34, which acts as a second nozzle wall. The tabs 30, slots 32, and other described components move relative to one another, and as such it would be desirable to reduce the friction therebetween for tribological purposes.

Figure 2:
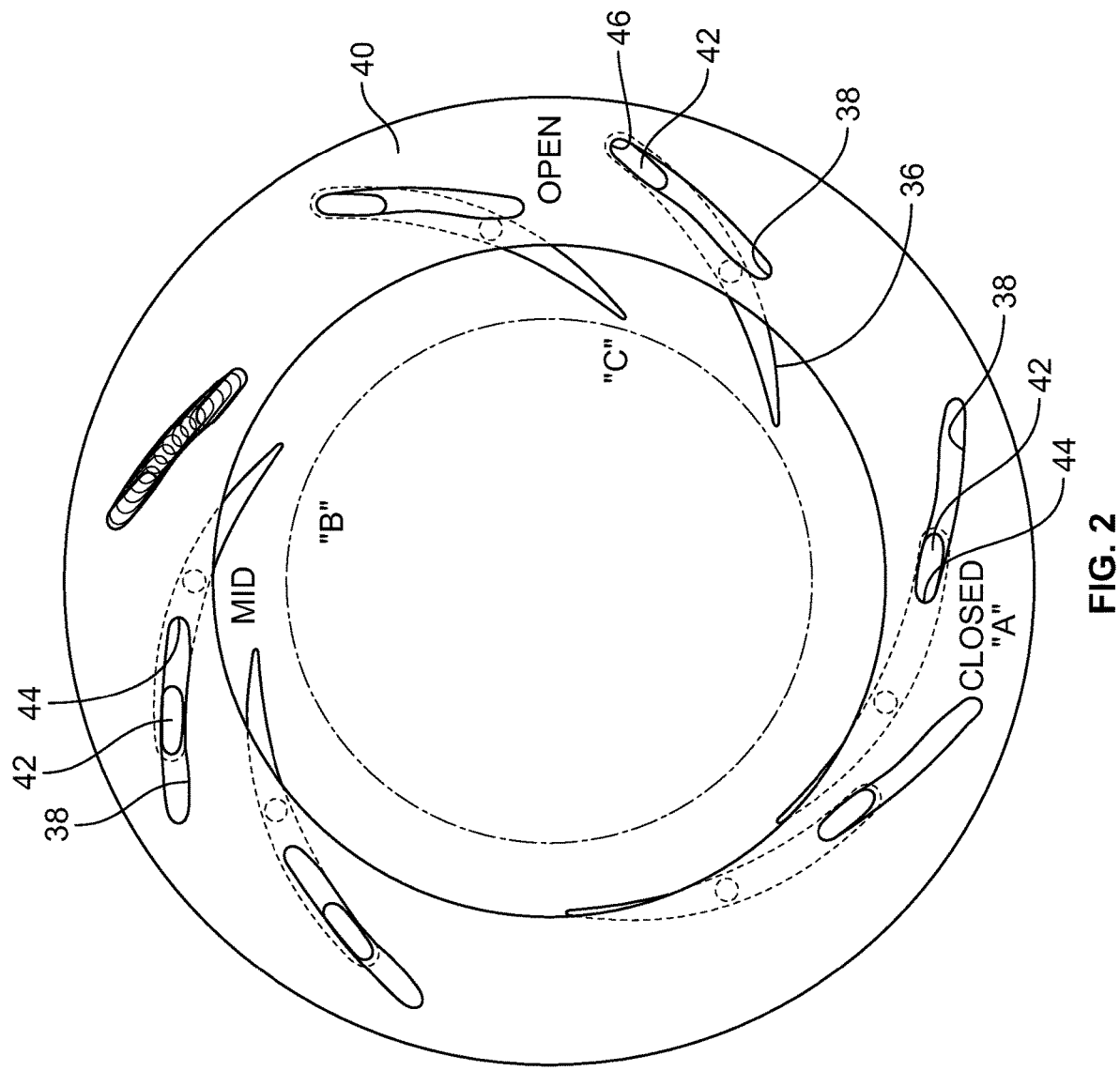
FIG. 2 is a cross-section view of the turbocharged internal combustion engine of FIG. 1.

FIG. 2 illustrates the general movement pattern of conventional vanes 36, as used in the VGT described and illustrated above, when actuated by the unison ring 34. Each vane tab 42 is disposed within a respective elongated slot 38 of a unison ring 40. In a closed position "A", the vane tab 42 is positioned adjacent a first end 44 of the slot 38. This position is referred to as a closed position because the vane is not flared radially outward, thereby serving to limit the flow of exhaust gas to the turbine. At an intermediate position "B" the unison ring 40 has been rotated a sufficient amount such that the vane tab 42 is moved within the slot 38 away from the first slot end 44 (as opposed to second slot end 46) towards a middle position of the slot. Again, it would be desirable to reduce friction as the components of the vanes 36 move relative to the components of the unison ring 40, for tribological purposes.

Figure 3:
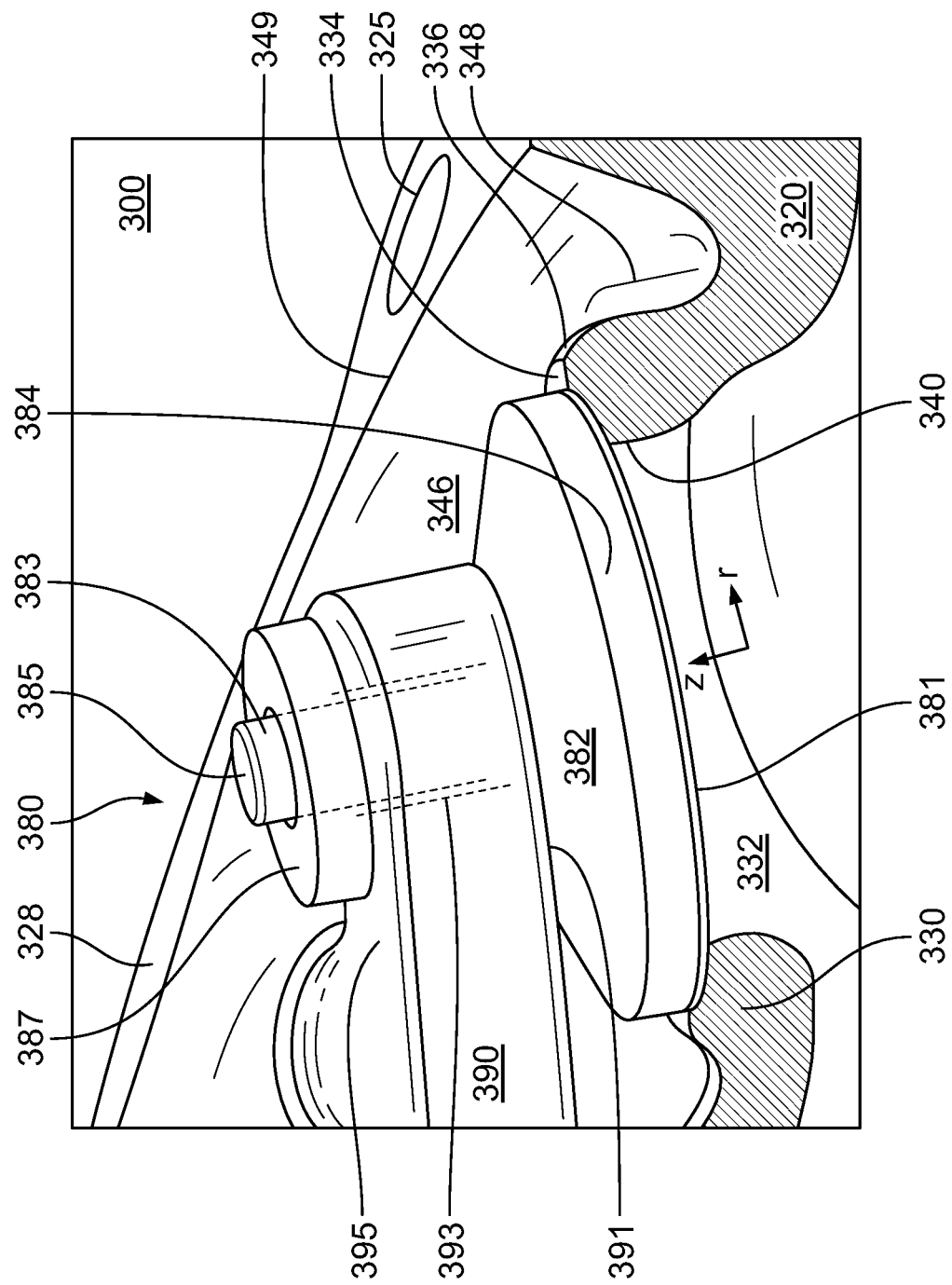
FIG. 3 is a system view of a turbocharger including a waste-gate system in accordance with the present disclosure.

Additionally, as noted above, waste-gate systems may also include tribological components, and as such, for completeness of disclosure, FIG. 3 illustrates an exemplary waste-gate system. Specifically, FIG. 3 shows a cutaway view of an example of an assembly 300 that includes a turbine housing component 320 and a waste-gate 380. In the assembly 300, the turbine housing component 320 includes an opening 340, for example, as defined by a surface 332 of a substantially cylindrical wall portion 330 of the turbine housing component 320. As shown, the wall 332 extends to an edge (e.g., defining the opening 340) and then flattens joining a relatively flat surface 334, which may be referred to as a waste-gate seat. In the example of FIG. 3, the surface 332 defines a relatively short passage, for example, having an axis (e.g., a z-axis), from which the surface 332 is disposed at a radial distance (e.g., an r-axis). Extending away from the opening 340, the seat 334 descends along another surface 336 (e.g., of the substantially cylindrical wall portion 330) to a floor 348 of an exhaust chamber formed in part by the turbine housing component 320, for example, in combination with a wall surface 346. As shown in FIG. 3, the wall surface 346 of the turbine housing component 320 rises to an edge that defines an opening 349 of the exhaust chamber and then extends outwardly to a relatively flat surface 328, which may include one or more apertures, etc., such as an aperture 325, for example, to attachment of another component to the turbine housing component 320.

In the example of FIG. 3, the waste-gate 380 includes a plug portion 382 that is connected to a waste-gate arm 390. The plug portion 382 includes a lower surface 381, a stem 383 that extends upwardly to an upper end 385 of the plug portion 382 and a rim surface 384 (e.g., disposed at a radius about the stem 383 and having an axial height). As shown, the stem 383 is received by a bore 393 of the waste-gate arm 390 where the bore 393 extends between a lower surface 391 and an upper surface 395 of the waste-gate arm 390. In the example of FIG. 3, a clamping washer 387 clamps to the stem 383 of the plug portion 382 to thereby prevent the stem 383 from sliding through the bore 393 of the waste-gate arm 390. Accordingly, as the waste-gate arm 390 pivots, the lower surface 381 of the plug portion 382 is positioned with respect to the seat 334 of the turbine housing component 320 for opening and closing of the waste-gate 380.

Typical embodiments of the present disclosure reside in a motor vehicle equipped with a gasoline or diesel powered internal combustion engine and a turbocharger. The turbocharger is equipped with a unique combination of features that may, in various embodiments, provide efficiency benefits by relatively limiting the amount of (and kinetic energy of) secondary flow in the turbine and/or compressor, as compared to a comparable unimproved system. Stainless steel alloys for use in turbochargers may have operating temperatures up to about 1050° C. (or up to about 1100° C.), or greater. Some embodiments of the present disclosure are directed to stainless steel alloys that include iron alloyed with various alloying elements, as are described in greater detail below in weight percentages based on the total weight of the alloy. The description of particular effects with regard to the inclusion of certain weight percentages of materials, as set forth below, are particular to the alloy of the present disclosure, and as such should not be understood as applying to any other alloy. Moreover, the description of particular effects with regard to the inclusion of certain weight percentages of materials is not intended to limit the scope or content of the present disclosure.

As such, in an embodiment, the stainless steel alloy of the present disclosure includes from about 23% to about 27% chromium (Cr), for example from about 24% to about 26% Cr, such as about 25% to about 26% Cr. It has been discovered that if Cr is added excessively, coarse primary carbides of Cr are formed, resulting in extreme brittleness. As such, the content of Cr is preferably limited to a maximum of about 27% so as to maintain an appropriate volume fraction within the stainless steel for corrosion resistance.

In an embodiment, the stainless steel alloy of the present disclosure includes from about 18% to about 22% nickel (Ni), for example about 19% to about 21% Ni, for example about 19.5% to about 20.5% Ni. Ni is an element to stabilize the austenite phase. Thus, the content of Ni preferably ranges from about 18% to about 22%.

In an embodiment, the austenitic stainless steel alloy of the present disclosure includes from about 0.5% to about 2.0% manganese (Mn), for example about 1.0% to about 1.5% Mn, such as about 1.1% to about 1.3% Mn. Mn is effective like Si as a deoxidizer for the melt, and has a function of improving the fluidity during the casting operation. To exhibit such function effectively, the amount of Mn is about 2.0% or less, preferably about 2.0%. Mn generally has a content of greater than about 0.5% to adjust a metal flow rate. However, when the content of Mn is excessive, Mn is combined with sulfur of the steel and forms excessive levels of manganese sulfide, thereby deteriorating the corrosion resistance and the hot formability. Thus, the upper limit content of Mn is limited to 2.0%.

In an embodiment, the stainless steel alloy of the present disclosure includes from about 0.0% to about 0.5% molybdenum (Mo), such as about 0.05% to about 0.3% Mo, for example about 0.05% to about 0.2% Mo. If the content of Mo is excessive, Mo is likely to form the sigma phase when it is annealed, thereby deteriorating the corrosion resistance and impact resistance, which is deleterious to the tribological properties of the kinematic components of a turbocharger described herein.

In an embodiment, the stainless steel alloy of the present disclosure includes from about 1.2% to about 1.4% carbon (C), for example about 1.25% to about 1.35% C. A specific embodiment may employ about 1.3% C. C has a function of improving the sintering ability of the alloy. C, when present in the relatively-high disclosed range, also forms a eutectic carbide with niobium (which, as discussed in greater detail below, may also be included in the alloy), which improves wear resistance. To exhibit such functions effectively, the amount of C should be 1.2% or more. Further, C is effective for strengthening a material by solid solution strengthening. To maximize the corrosion resistance, the content of C is lowered to about 1.4% and below.

In an embodiment, the stainless steel alloy of the present disclosure includes from about 1.6% to about 1.8% silicon (Si), for example about 1.65% to about 1.75% Si. A specific embodiment may employ about 1.7% Si. Si has effects of increasing the stability of the alloy metal structure and its oxidation resistance. Further, Si has functions as a deoxidizer and also is effective for improving castability and reducing pin holes in the resulting sintered products, when present in an amount greater than about 1.6%. If the content of Si is excessive, Si deteriorates the mechanical property such as impact toughness of stainless steel. Therefore, the content of Si is preferably limited to about 1.8% and below.

In an embodiment, the stainless steel alloy of the present disclosure includes from about 0.2% to about 0.4% nitrogen (N), for example about 0.25% to about 0.35% N, or about 0.3% N. The addition of nitrogen to the alloy in the foregoing amount allows for improved ductility to enable casting of the alloy into the desired form (i.e., a turbocharger kinematic component), and avoids the need to sinter the alloy. While it has been known that the addition of Nitrogen to alloys may result in brittleness, surprisingly in connection with the presently described alloy brittleness has not been observed, and thus the inclusion of nitrogen even in the relatively high amounts stated provides a substantial benefit in terms of manufacturing while avoiding the problems that have been known to occur when including nitrogen, even at lower amounts. The brittleness that has been observed in other alloys with the inclusion of nitrogen has been due to the formation of nitrides, but in the context of the present alloy, the formed nitrides surprisingly contribute most substantially to a further improvement in wear resistance, which is of particular importance for kinematic component applications as described herein. As such, the presently disclosed alloy includes nitrogen in the foregoing amounts.

Certain inevitable/unavoidable impurities may also be present in the stainless steel alloy of the present disclosure, for example as described below with regard to phosphorous and sulfur (the amounts of such described impurities (and others) are minimized as much as practical).

In an embodiment, phosphorus (P) may be present in the alloy, but is minimized to about 0.04% or less. P is seeded in the grain boundary or an interface, and is likely to deteriorate the corrosion resistance and toughness. Therefore, the content of P is lowered as low as possible. Preferably, the upper limit content of P is limited to 0.04% in consideration of the efficiency of a refining process. The contents of harmful impurities, such as P are as small as possible. However, due to cost concerns associated with removal of these impurities, and the P content is limited to 0.04%.

In an embodiment, sulfur (S) may be present in the alloy, but is minimized to about 0.01% or less. S in steels deteriorates hot workability and can form sulfide inclusions that influence pitting corrosion resistance negatively. It should therefore be limited to less than 0.01%. S deteriorates the hot formability, thereby deteriorating the corrosion resistance. Therefore, the content of S is lowered as low as possible. The contents of harmful impurities, such as S (sulfur), are as small as possible. However, due to cost concerns associated with removal of these impurities, the S content is limited to about 0.01%.

In some embodiments, high-cost elements that have in the prior art been proposed for inclusion in stainless steels are specifically excluded from the alloy (except in unavoidable impurity amounts). These excludable elements are, for example, Nb, W, Co, and V. Any number or combination of the foregoing elements may be excluded, in various embodiments.

The disclosed alloys, being stainless steel alloys, also include a balance of iron (Fe). As used herein, the term "balance" refers to the amount remain to achieve 100% of a total alloy, in terms of weight. It should be appreciated that this amount may differ if an embodiment "comprises," "consists of," or "consists essentially of" the stated elements, with the balance being Fe.

The articles of manufacture described herein, such as the kinematic components of a turbocharger fabricated with the above-described stainless steel alloys, may be formed using sintering processes. For example, as is known in the art, sintering refers to a process of compacting and forming a solid mass of material by heat and/or pressure without melting the material to the point of liquefaction. The articles may also be fabricated using a casting process, or a metal injection molding (MIM) process, or they may be wrought.

As such, embodiments of the present disclosure provide materials that are suitable for use in fabricating kinematic components for turbine engines that can resist wear during elevated temperature operations. As noted above, examples of turbocharger systems that may include kinematic components include waste-gate systems and variable geometry systems. Of course, the described embodiments should not be considered limited to such components, but they may be considered applicable to any articles of manufacture where an iron alloy, or a stainless steel alloy may be employed. The described material may provide an effective, and low cost, substitute for 310-grade stainless steel or other stainless steels that have higher nickel content or include high-cost elements such as Nb, W, Co, and V, for example.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbocharger kinematic component consisting of:
    an austenitic stainless steel alloy, wherein the austenitic stainless steel alloy consists of, by weight:
        about 23% to about 27% chromium,
        19.5% to 20.5% nickel,
        about 0.5% to about 2.0% manganese,
        about 1.2% to about 1.4% carbon,
        about 1.6% to about 1.8% silicon,
        about 0.2% to about 0.4% nitrogen,
        about 0% to about 0.5% molybdenum, and
        a balance of iron, and unavoidable impurities that are present in trace amounts.

2. The turbocharger kinematic component of claim 1, wherein chromium is present in an amount of about 24% to about 26%, by weight, in the austenitic stainless steel alloy.

3. The turbocharger kinematic component of claim 1, wherein manganese is present in an amount of about 1.0% to about 1.5%, by weight, in the austenitic stainless steel alloy.

4. The turbocharger kinematic component of claim 1, wherein molybdenum is present in an amount of about 0.05% to about 0.3%, by weight, in the austenitic stainless steel alloy.

5. The turbocharger kinematic component of claim 1, wherein silicon is present in an amount of about 1.65% to about 1.75%, by weight, in the austenitic stainless steel alloy.

6. The turbocharger kinematic component of claim 1, wherein carbon is present in an amount of about 1.25% to about 1.35%, by weight, in the austenitic stainless steel alloy.

7. The turbocharger kinematic component of claim 1, wherein nitrogen is present in an amount of about 0.25% to about 0.35%, by weight, in the austenitic stainless steel alloy.

8. The turbocharger kinematic component of claim 1, wherein sulfur is present as an unavoidable impurity in a non-zero amount of less than about 0.01%, by weight, and phosphorous is present as an unavoidable impurity in a non-zero amount of less than about 0.04%, by weight, in the austenitic stainless steel alloy.

9. The turbocharger kinematic component of claim 1, wherein the turbocharger kinematic component forms part of a waste-gate system or a variable-geometry system.

10. A turbocharger comprising the turbocharger kinematic component of claim 1.

* * * * *